United States Patent [19]
Grimes

[11] Patent Number: 5,353,147
[45] Date of Patent: Oct. 4, 1994

[54] IDENTIFICATION OF TRANSMISSION CHARACTERISTIC

[75] Inventor: Gary J. Grimes, Thornton, Colo.

[73] Assignee: AT&T Bell Laboratories, Murray Hill, N.J.

[21] Appl. No.: 800,782

[22] Filed: Nov. 27, 1991

[51] Int. Cl.⁵ .................. H04B 10/12; H04B 10/08
[52] U.S. Cl. ....................... 359/173; 359/110; 359/161; 359/140; 356/73.1
[58] Field of Search ............... 359/110, 124, 140, 143, 359/153, 158, 161, 173; 455/69, 70; 375/109; 370/14, 15, 17; 379/2, 24; 356/72, 73.1

[56] References Cited

U.S. PATENT DOCUMENTS

| | | | |
|---|---|---|---|
| 4,751,510 | 6/1988 | de Saint Michel | 370/17 |
| 4,994,675 | 2/1991 | Levin | 359/110 |
| 5,046,807 | 9/1991 | Unitt | 359/113 |
| 5,066,139 | 11/1991 | Soderberg | 370/15 |
| 5,099,349 | 3/1992 | Yoshida | 359/161 |

Primary Examiner—Leslie Pascal
Attorney, Agent, or Firm—John C. Moran

[57] ABSTRACT

An apparatus to determine characteristics of an optical communication path by utilizing electrical devices in an electrical path in parallel with the optical communication path. Each electrical device is physically located with a passive or active optical device and specifies the attenuation and delay of the optical device. A receiver measures the electrical qualities of each electrical device in the electrical path which is parallel to the optical path from the optical transmitter. The electrical measurements allow the receiver to automatically adjust its optical receiver to the attenuation and delay introduced by the optical devices in the optical path.

38 Claims, 10 Drawing Sheets

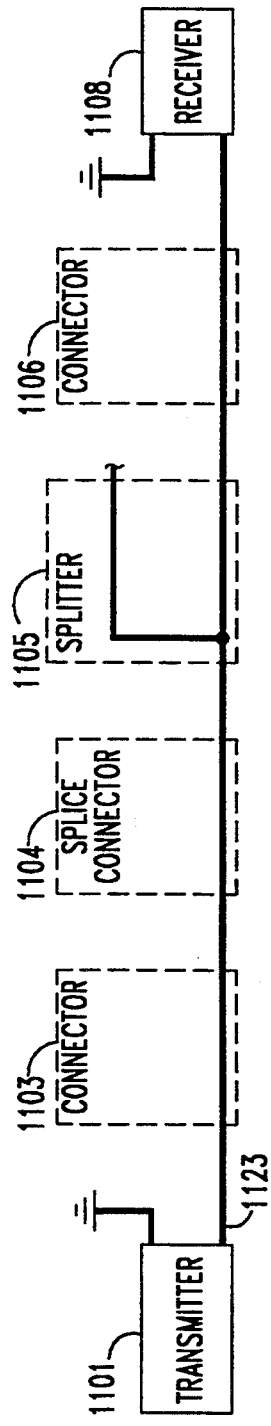
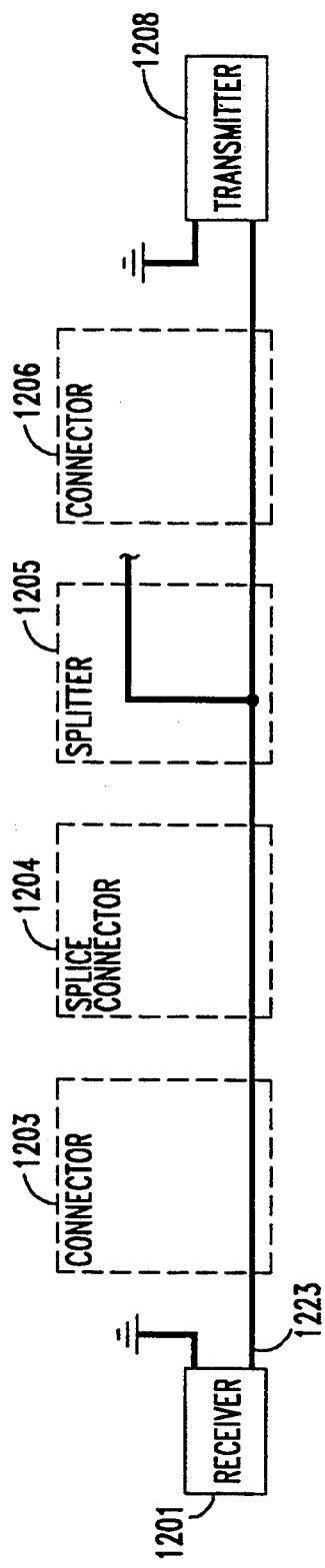
FIG. 11
FIG. 12

IDENTIFICATION OF TRANSMISSION CHARACTERISTIC

TECHNICAL FIELD

The present invention relates to transmission systems, and, in particular, to the determination of performance characteristics components in a transmission network.

BACKGROUND OF THE INVENTION

The identification of transmission path characteristics is not only important for assuring reliable transmission over the transmission path, but also, as is the case for an optical link, assuring the safety of people using the optical link. The safety issue occurs when the optical transmitter transmitting on the optical link uses a laser. Since light from a laser can damage a person's eyes, precautions must be taken to prevent the laser from being turned on if the optical transmitter is not properly terminated by the optical link.

In most transmission systems, losses and delays are introduced into the transmission path by the transmission media, splices, connectors, splitters, combiners, amplifiers, repeaters, attenuators, etc. This is particularly true of fiber optic transmission systems. The result is that receivers have to be more complex and costly in order to compensate for optical loss and delay in various optical paths. If the losses vary greatly from receiver to receiver due to a varying number of passive and active optical devices within the transmission path, the receivers are not capable of compensating for this variation. In this case, each individual receiver must be adjusted for the signal level and delay.

One prior art method for correcting this type of a situation is to manually adjust the receivers by physically adjusting the receiver or by entering information into a computer controlling the transmission system and having the computer adjust each individual receiver. The problems with a manual adjustment procedure are expense and probability of human errors.

Where the attenuation is the only concern, U.S. Pat. No. 5,060,302 discloses an optical receiver feeding back information to the optical transmitter to adjust the output of the optical transmitter. There are two problems with this prior art solution. First, it only functions where a transmitter is driving a single receiver; and second, it requires an additional optical transmitter and receiver for the feedback path which is expensive.

Another prior art method which does not require manual entry of data is disclosed in U.S. Pat. No. 4,295,043. This patent discloses the use of a connector which identifies the length of attached cable by predefined electrical contacts placed on the connector of the cable. Different connectors are used for different lengths of optical fiber when the cable is being assembled. The receiver then automatically adjusts to the cable length based on the electrical contacts and assumes a predefined transmitter output. This method does allow a receiver to adjust for particular lengths of optical fiber and a given transmitter output. However, it does not allow two lengths of optical fiber cable to interconnect the transmitter and receiver. Nor does the method allow for any type of passive or active optical devices to be in the communication path from the transmitter to the optical receiver.

There exists a need for a method which allows a plurality of optical receivers to automatically adjust to the signal levels communicated to these receivers from a single transmitter when the optical transmission paths to each of the receivers is different due to the introduction of passive and active optical devices. The need for this solution becomes more acute as optical fiber links are utilized in the office and residential environments. As optical systems are utilized in either of these environments, it becomes necessary to introduce a variety of passive and active devices between a single transmitter and a plurality of receivers. The expense and the probability of error of manually adjusting each receiver becomes prohibitive in these environments.

Returning to the safety problem, the prior art has used two methods to assure safety when a laser is driving an optical link. The first method is to use mechanical interlocks to assure that an optical link is connected to a transmitter before the laser can be turned on. The problem with this method is the expense of providing the interlocks. Further, light transmitted from a laser via a multimode optical fiber can still damage a person's eyes so that the mechanical interlocks can only be used with single mode optical fiber. U.S. Pat. No. 5,039,194 discloses the second method that uses an optical transmitter and receiver at each end of the optical link. Each transmitter transmits a very short pulse (which will not cause eye damage), and the associated receiver waits to detect a pulse from the other transmitter at the other end of the optical link. If both receivers receive the pulses, the transmitters begin normal operations. This method is very expense since it requires a transmitter and receiver at both ends of the optical link. Also, the costs of the control circuitry is high. As lasers gain wider use in office and residential environments, the safety problem will become more important. Hence, there exists a need for a cheaper and more reliable way to assure safety when a laser is used to drive an optical link.

Further, there exists a need in large optical transmission systems to verify the actual optical components against the planned optical components in any given optical path within the optical transmission system. This need is particularly relevant to the residential environment which requires a large number of optical components.

SUMMARY OF THE INVENTION

The foregoing problems are solved by an apparatus that utilizes electrical devices in an electrical path in parallel with an optical communication path to identify information about optical devices in the optical path. Each electrical device is physically located with a passive or active optical device and specifies performance characteristics of the associated optical device such as attenuation and delay. A receiver adjusts to the output of a transmitter by measuring the electrical qualities of each electrical device in the electrical path which is parallel to the optical path from the optical transmitter. These electrical measurements allow each receiver to automatically adjust its optical receiver to the performance characteristics introduced by the optical devices in the optical path. Further, by making electrical measurements at the transmitter's end of the link, it can be determined if it is safe to turn on a laser. In addition, the transmitter transfers information identifying the optical devices to a central computer system which stores the information on an optical path basis.

In one illustrious embodiment, the parallel electrical path is a series circuit. Each of the passive and active optical devices incorporates at least one input and output optical connection. For each pair of input and output optical connections, there are two pairs of input and output electrical connections. One pair of electrical connections is for the forward path from the transmitter to receiver, and the second pair of electrical connections is for the return path from the receiver to the transmitter. The electrical devices are pan of the same assembly as the optical devices. For example, a simple connector interconnects two optical fibers as well as provide two input contacts and two output contacts for the electrical path and provides a facility for interconnecting an electrical device between the pair of contacts in the forward path. In this embodiment, the electrical portion of the transmitter contains a voltage reference, and the electrical device utilized in conjunction with each optical device is an electrical resistor in series with the forward electrical path. The value of the resistor is indicative of the expected loss of the optical device. Each receiver measures the amount of current flowing to it against a predefined value and automatically adjusts the gain of the optical receiver. If the optical receiver is unable to adjust to the received optical power, the optical receiver sends an alarm message to a system computer. A similar approach could also be used to predict delay. Upon predicting the delay, the receiver sends a message to the system computer so that the system computer can compensate for the delay.

From a laser safety point of view, if no current is being received back by the electrical portion of the transmitter, the link is not terminated on a receiver, and the laser should not be turned on. Hence, the electrical portion prevents the laser from turning on. In addition, the transmitter sends a message to a system computer to inform the system computer that no transmission can occur. If the receiver is not receiving current, it informs its system computer that the link is not operational.

In a second illustrious embodiment, both a resistor and a inductor is used in conjunction with each optical device to indicate both attenuation and delay. The electrical part of the transmitter alternates between sending AC and DC electrical current. Each receiver is responsive to receipt of DC current to calculate the attenuation in the optical transmission path from the transmitter on the basis of resistance and is responsive to AC current to measure the delay in the optical transmission path from the optical transmitter on the basis of inductance. The receiver sends a message to a system computer so that the system computer can compensate for the delay. Safety would be assured in the same manner as described for the first embodiment.

In a third illustrious embodiment, the electrical path consists of four electrical connectors with two of these electrical connectors supplying power to active electrical devices associated with each optical device. Frames of data specifying the optical characteristics of each optical device in the optical path between the optical transmitter and an optical receiver is transmitted on a third conductor of the electrical path. (Such frames of data are commonly called data packets.) Clock information is transmitted on a fourth conductor of the electrical path. Each electrical device is responsive to a frame of data to insert into that frame its information specifying the type of optical device associated with the electrical device. In response to each frame, the receiver utilizes the digital information of the frame to calculate both the attenuation and delay introduced into the optical transmission path. Additionally, the receiver sends this information to the system computer allowing the system computer to identify each element in the transmission path for maintenance and operational purposes. Also, other information could be provided by each electrical device.

In the third embodiment that uses well known self-clocking techniques, both data and clock information are transmitted on the third conductor. Upon receiving a frame of information, the receiver transmits the frame back to the transmitter on the fourth conductor. Each electrical device merely relays the frame received via the fourth conductor to the next electrical device until the frame is received by the electrical portion of the transmitter. The electrical portion determines from the frame whether it is safe to enable the laser. In addition, the information sent to the system computer controlling the transmitter for maintenance and operational purposes. One operational purpose is to determine the identity of optical devices in each optical path and to determine the difference between the actual configuration of a path and the planned configuration. This operational purpose is particularly important in the residential environment.

Other and further aspects of the present invention will become apparent in the course of the following description and by reference to the accompanying drawing.

BRIEF DESCRIPTION OF THE DRAWING

FIGS. 11 and 12 illustrate alternate embodiments of the invention to assure safe operation of an optical transmitter;

DETAILED DESCRIPTION

Figure 1:
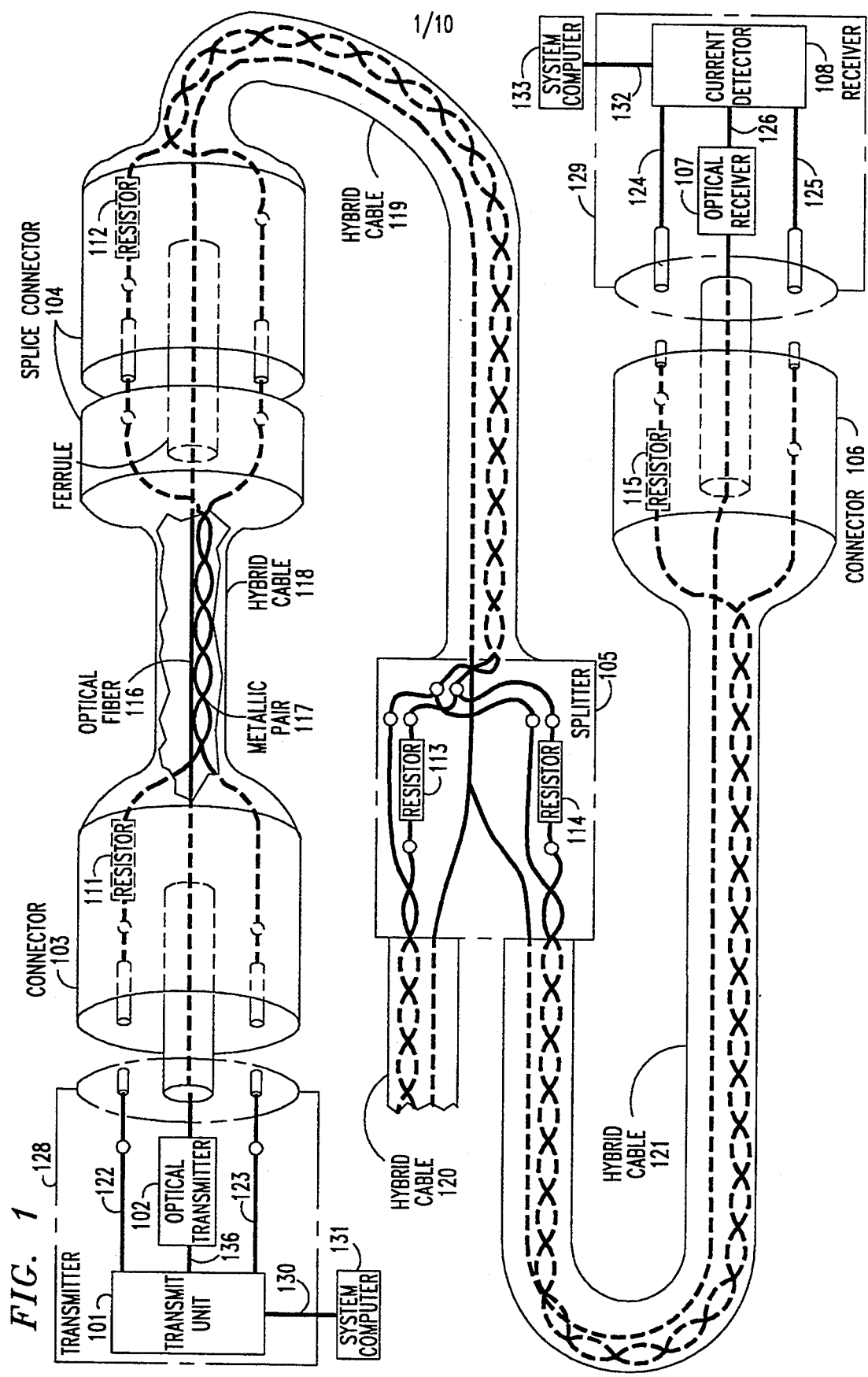
FIG. 1 illustrates one embodiment in accordance with the invention.
Figure 2:
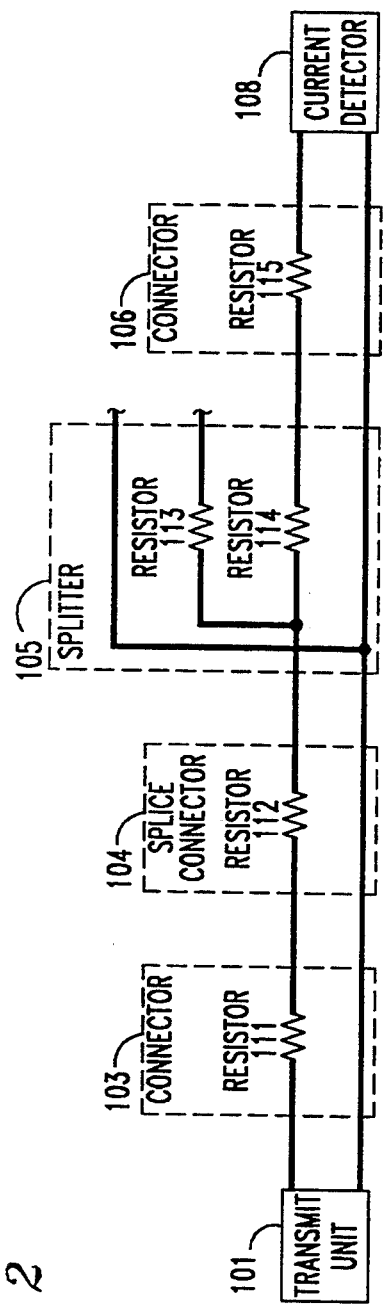
FIG. 2 illustrates the electrical schematic of the embodiment illustrated in FIG. 1.

FIG. 1 illustrates a pictorial representation of one embodiment in accordance with the invention. As illustrated in FIG. 1, transmitter 128 is interconnected to receiver 129 by connector 103, hybrid cable 118, connector 104, hybrid cable 119, splitter 105, hybrid cable 121, and connector 106. Each of these elements communicates both optical and electrical signals. The optical attenuation introduced into the optical signal is determined at receiver 129 by determining the total resistance introduced by resistors 111, 112, 114, and 115 to the flow of current from electrical transmit unit 101 to current detector 108. This electrical circuit is illustrated in FIG. 2 in schematic form. Transmit unit 101 produces a constant voltage. Current detector 108 determines the total resistance of resistors 111, 112, 114, and 115 by measuring the current flowing through the series path established between transmit unit 101 and current detector 108. Current detector 108 then utilizes the measured current to determine the resistance; and in response to that determination, current detector 108 adjusts optical receiver 107 to have the proper sensitivity to receive optical signals transmitted by optical transmitter 102. The manner in which current detector 108 determines the amount of current flowing and utilizes this information to adjust optical receiver 107 is well known to those skilled in the art. If optical receiver 107 cannot obtain the proper sensitivity, receiver 107 transmits message to system computer 133 of this fact via cable 132.

To prevent optical transmitter 102 from transmitting light without the optical link being completed to optical receiver 107, transmit unit 101 determines the amount of current being received via conductor 123. If this current is above a predefined amount, transmit unit 101 sends an enabling signal via conductor 136 to enable optical transmitter 102; otherwise, transmit unit 101 sends a disable signal. If transmit unit 101 transmits a disable signal to optical transmitter 102, unit 101 also sends a message to system computer 131 via cable 130 informing computer 131 that the optical link cannot be used.

To illustrate how optical transmitter 102 can be adjusted rather than optical receiver 107, assume in FIG. 1 that splitter 105 is replaced with another splice connector like splice connector 104. Transmit unit 101 is responsive to the current returned in conductor 123 to adjust the output of optical transmitter 102 via cable 129. That adjustment is similar to the previously described adjustment of optical receiver 107 by current detector 108. Should the return current be below the predefined level, transmit unit 101 adjusts the output of optical transmitter 102 to zero.

Figure 6:
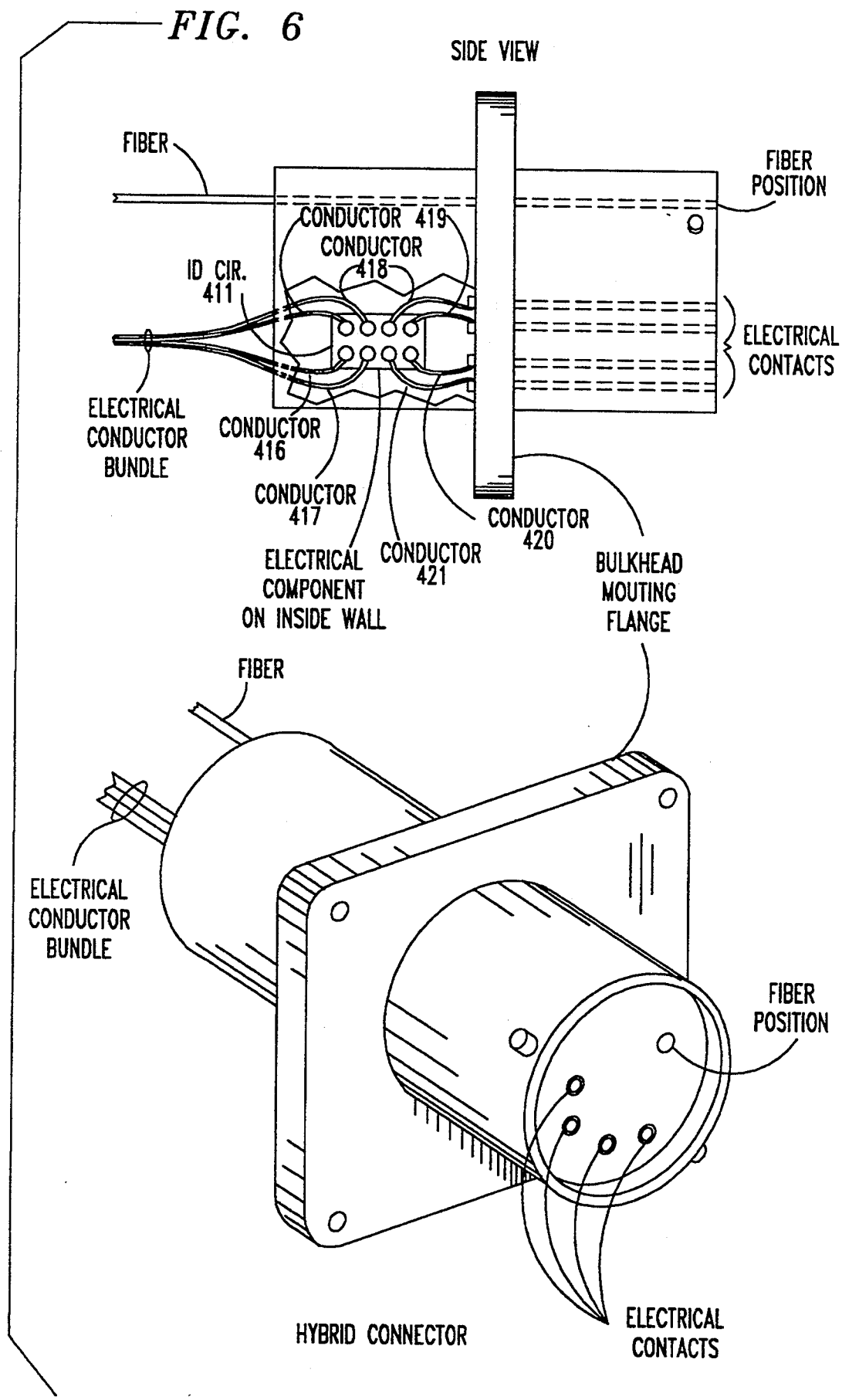
FIG. 6 illustrates an electrical and an optical connector for utilization with the third embodiment of FIG. 4.

Splice connector 104 is similar to the connector illustrated in FIG. 6 with the exception that splice connector 104 has only four electrical contacts rather than eight as illustrated in FIG. 6. Connector 103 and 106 are similar to FIG. 6. The optical functions of splitter 105 are well known to those skilled in the art and the connections into and out of splitter 105 are similar to those made to receiver 129 and transmitter 128, respectively.

The resistors illustrated in FIG. 1 and 2 could also be used to supply delay information for the adjustment of delay components in receiver 129. For the case where resistors 113 and 114 indicate optical loss, they can be made unequal for splitters which have a split ratio other than 50%/50%. Similarly for the case where resistors 113 and 114 indicate delay, they can be made unequal for the case in which hybrid cables 120 and 121 are of different lengths.

Figure 3:
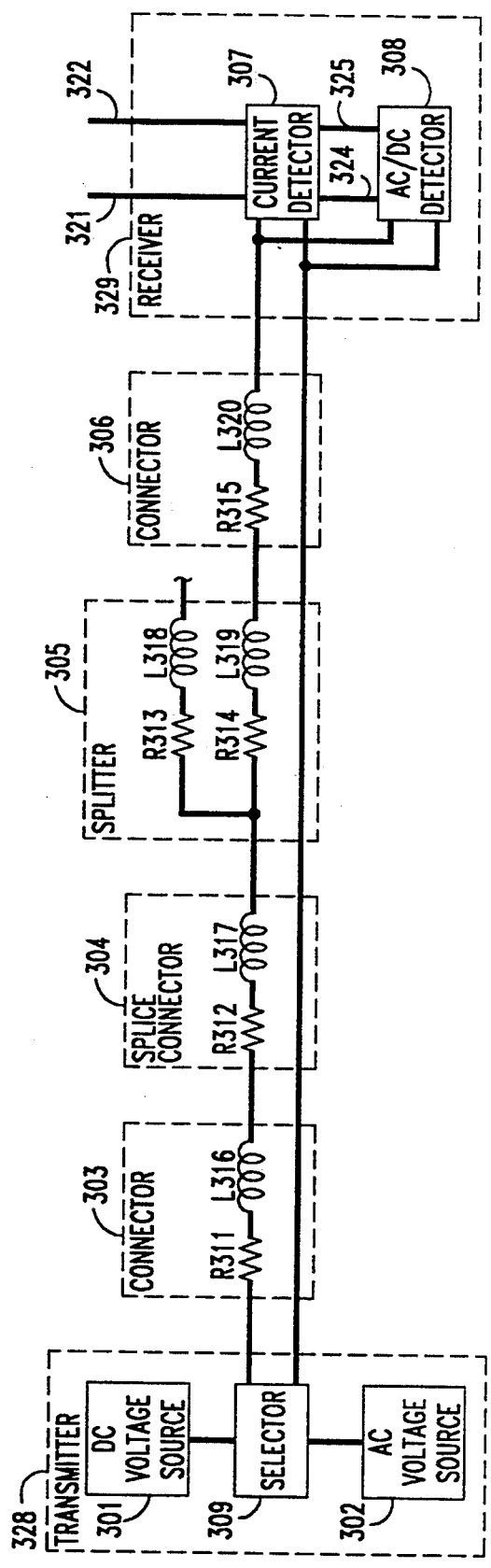
FIG. 3 illustrates the electrical schematic of a second embodiment of the invention.

FIG. 3 illustrates the electrical circuit for a transmission arrangement such as illustrated in FIG. 1 with the exception that an inductor is also placed in series with each resistor. The resistor is used to indicate the attenuation, and the inductor is utilized to indicate the delay. The electrical portion of transmitter 328 which is equivalent to transmitter 128 of FIG. 1 first transmits a constant DC voltage on the metallic pair that is the equivalent of pair 117 and then transmits a constant AC voltage. Selector 302 determines whether a DC or AC voltage is to be transmitted.

The electrical portion of receiver 329 utilizes AC/DC detector 308 to determine whether DC or AC is being transmitted over the electrical path. If a DC signal is being transmitted, detector 308 transmits a signal on conductor 325; however, if an AC signal is being transmitted, detector 308 transmits a signal on conductor 324. In response to a signal on conductor 325, current detector 307 determines the total resistance to the DC voltage being outputted by selector 309. In response to a signal on conductor 324, detector 307 determines the total reactance to the AC voltage being outputted by selector 309. Current detector 307 outputs a signal on 321 to control the optical receiver to adjust for the attenuation, and a signal on conductor 322 to adjust a delay circuit for compensating for the delay over the optical path between transmitter 328 and receiver 329. Those skilled in the art would immediately envision how capacitors could also be utilized in the electrical circuit illustrated in FIG. 3.

Those skilled in the art would immediately envision how the safety feature of FIG. 1 could be incorporated into the electrical circuits illustrated in FIG. 3. Further, those skilled in the art would immediately envision how to adjust an optical transmitter rather than an optical receiver as was described with respect to FIG. 1.

Figure 4:
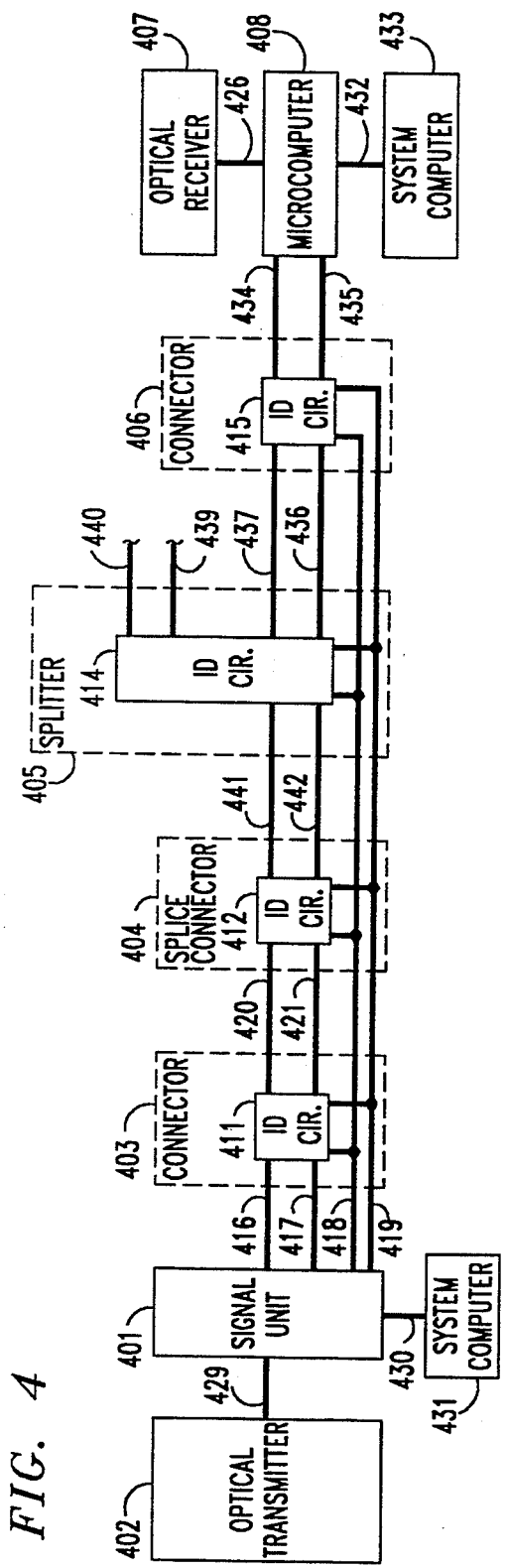
FIG. 4 illustrates the electrical schematic of a third embodiment utilizing active electrical devices to characterize associated optical devices.

FIG. 4 illustrates a third embodiment of the invention, an active identification circuit (ID CIR.) is used in place of the resistors illustrated in FIG. 1 in each of the optical devices. In addition, each identification circuit receives a clock signal, data signal, voltage, and ground. For example, identification circuit 411 receives a clock via conductor 416, data via conductor 417, an operating voltage via conductor 418, and a ground connection via conductor 419. Identification circuit 411 communicates similar inputs to identification circuit 412. A data packet is transmitted from signal unit 401 to microcomputer 408. The clock signals define the data times with the data being transmitted over a conductor such as conductor 417. As each identification circuit receives the packet, each identification circuit places its own identification information at the end of the packet and retransmits the packet to the next identification circuit. When the packet reaches microcomputer 408, microcomputer 408 then utilizes the information from each identification circuit to determine such factors as attenuation, delay, and the number of optical devices in the communication path to the transmitter unit. The packet that is transmitted uses standard packet protocols where a start flag determines the start of the packet, and a stop flag determines the end of the packet.

Signal unit 401 generates the clock signals on conductor 416 and transmits out on conductor 417 a start flag followed by a end flag. Identification circuit 411 is responsive to the end flag to insert its own identification information into the packet in place of the end flag and then to insert a new end flag. The packet is then transferred to identification circuit 412 which performs the same operations. In turn, identification circuits 414 and 415 perform the same operation. The final packet which is received by microcomputer 408 contains identification information for each of the identification circuits. Microcomputer 408 is responsive to the packet for adjusting optical receiver 407 via cable 426 and for transferring the packet to system computer 433 via cable 432. The advantage of the system illustrated in FIG. 4 is that the data transmission rate from signal unit 401 to microcomputer 408 can be at a very low transmission rate since microcomputer 408 does not require a rapid update on the optical devices since these devices are seldomly changed. This lowers the cost of the elements illustrated in FIG. 4.

Those skilled in the art would readily realize that error correction codes could be inserted into the packet being transmitted from signal unit 401 to microcomputer 408. A self-clocking data stream could be utilized resulting in only one conductor being required to carry both the clock and data from signal unit 401 through the identification circuits.

Figure 5:
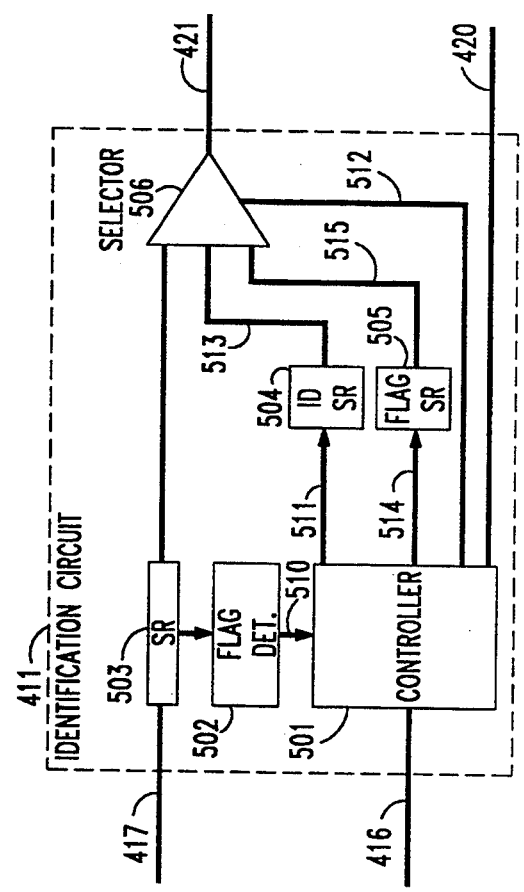
FIG. 5 illustrates, in block diagram form, an active electrical , device for use in FIG. 4.

FIG. 5 illustrates, in greater detail, identification circuit 411. Circuit 411 receives the clock signal via conductor 416 and the data signals via conductor 417. Although not shown in FIG. 5, the clock signals received via conductor 416 are also distributed to shift registers (SRs) 503 through 505. The data received via conductor 417 is shifted into shift register 503 under control of the clock signals. Flag detector 502 continuously examines the contents of shift register 503 to detect the end flag. Once the end flag is detected, flag detector 502 transmits a signal to controller 501 via conductor 510. In response to the signal from flag detector 502, controller 501 transmits signals to ID shift register 504 via conductor 511 to clock the identification information for circuit 411 out on conductor 513 to selector 506. Controller 501 also transmits signals via bus 512 to selector 506 so that the latter selector selects the information on conductor 513. ID shift register 504 internally reloads the identification code after it has been completely shifted out. After the identification information has been transferred to conductor 421 via selector 506, controller 501 transmits signals to flag shift register 505 to shift out a new end flag to selector 506 via conductor 515. Controller 501 also transmits information via bus 512 so that selector 506 selects the data on conductor 515 for communication on conductor 421. Note, identification circuit 414 is similar to identification circuit 411 of FIG. 5 with the exception that the equivalent of selector 506 drives conductors 436 and 439, and the equivalent of controller 501 drives conductors 437 and 440.

The identification information might uniquely identify each component so that the microcomputer could calculate the loss and delay parameters using data in its memory. This identification information might consist inclusively of loss and/or delay information or might be a combination of identification plus loss and/or delay information. Those skilled in the an would readily envision that a microcomputer could implement the functions described for identification circuit 411 in a stored program. Further, cable cuts and disconnection can be rapidly detected using the described procedure.

FIG. 6 illustrates, in greater detail, a connector suitable for use for connector 404 of FIG. 4. Other connectors would have a similar mechanical arrangement.

Figure 9:
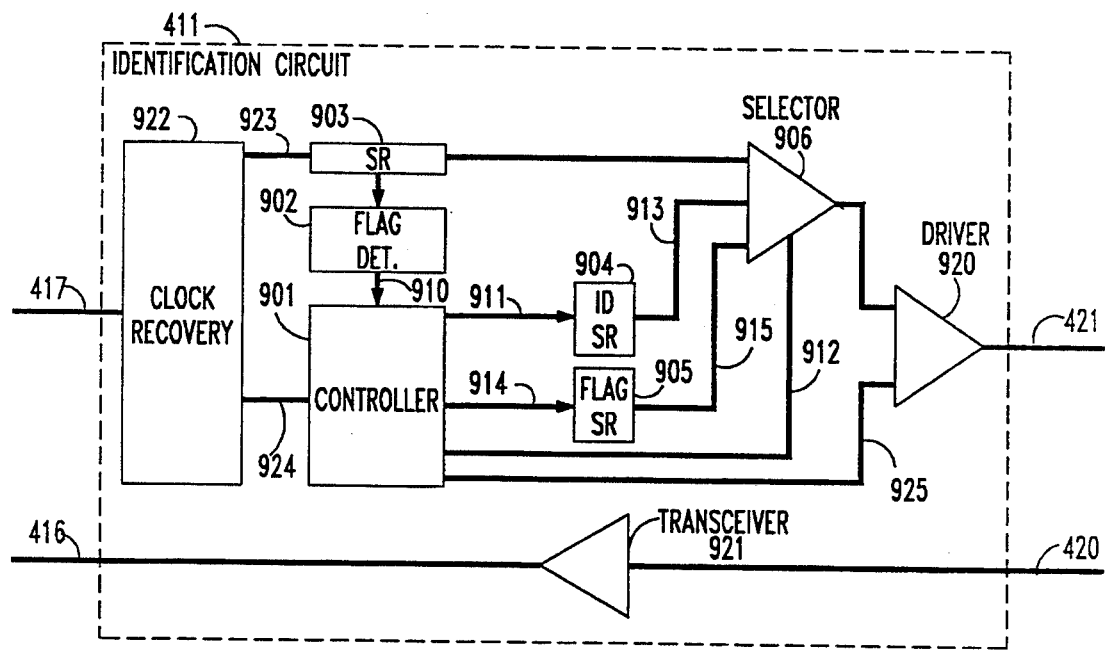
FIG. 9 illustrates an alternate embodiment of a identification circuit.

To provide safety features for the transmission system whose electrical schematic is illustrated in FIG. 4. it is desirable to transfer the packet received by microcomputer 408 back to signal unit 401. This is accomplished by converting the path (e.g. conductors 416 and 420) carrying the clock signals into a return data path and by using self-clocking data on forward data path (e.g. conductors 416 and 420) to microcomputer 408. FIG. 9 illustrates an alternate embodiment of the identification circuit of FIG. 4 which provides a return data path between microcomputer 408 and signal unit 401.

Figure 10:
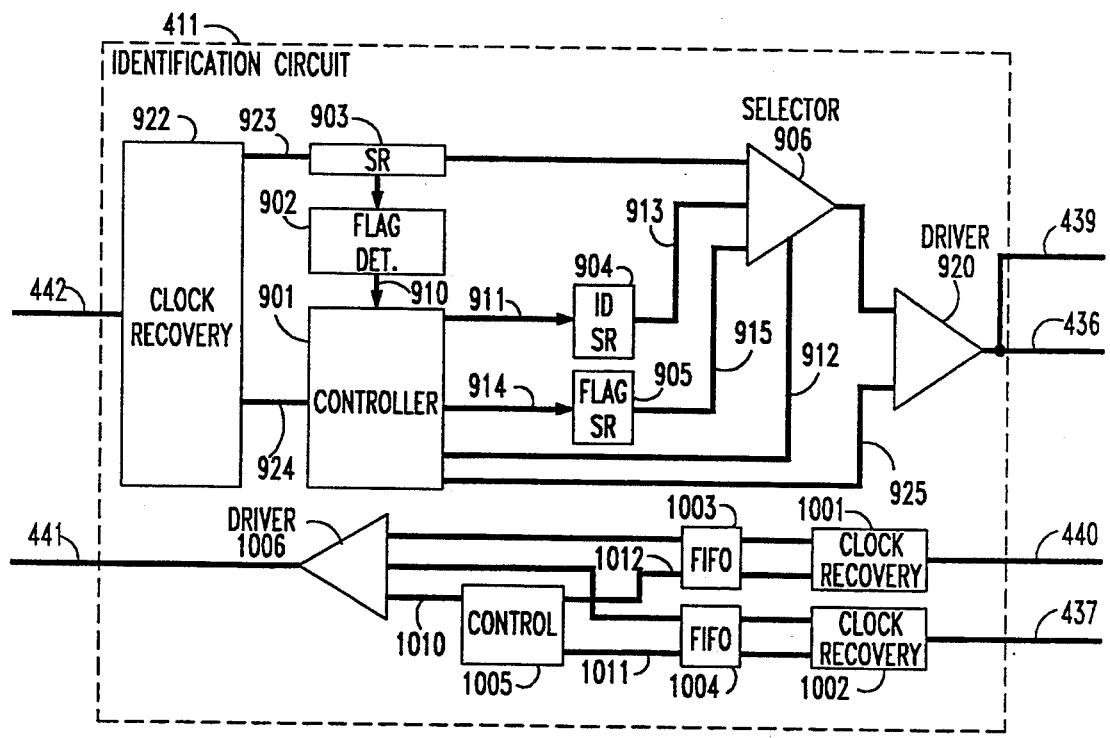
FIG. 10 illustrates another alternate embodiment of a identification circuit.

FIG. 10 illustrates another alternate embodiment of identification circuit 414 which also provides a return data path between microcomputer 408 and signal unit 401. First, the operations of signal unit 401 upon receiving a packet from microcomputer 408 are described, and then the operation of the identification circuits are described.

Microcomputer 408 is responsive to a packet from identification circuit 415 via conductor 435 to retransmit that packet back to identification circuit 415 via conductor 434. Each identification circuit retransmits the received retransmitted packet. Finally, signal unit 401 receives the packet via conductor 416 and determines from the returned packet whether or not to it is safe to allow optical transmitter 402 to turn on. If it is not safe, then signal unit 401 disables optical transmitter 402 and informs system computer 431 of this fact. Since the information concerns the type of optical components in the optical link, signal unit 401 analyzes the information to determine laser safety based on components in the optical link. As will be described in greater detail with respect to FIGS. 13 and 14, signal unit 401 also sends the packet to system computer 431 for maintenance and operational functions.

FIG. 9 illustrates an alternate embodiment of identification circuit 411. elements 901 through 915 perform the same operations as elements 501 through 515 of FIG. 5. Clock recovery 922 separates the data from the clock signals and transfers the clock signals to controller 901 and the data to shift register 903 via conductors 924 and 923, respectively. Driver 920 combines data from selector 906 and clock signals from controller 901 and transmits the resulting self-clocking data on conductor 421. Transceiver 921 receives the return packet on conductor 420 and retransmits that packet on conductor 416.

FIG. 10 illustrates an alternate embodiment of identification circuit 414. The blocks illustrated in both FIGS. 9 and 10 function in the circuit of FIG. 10 in the same manner as they function in the circuit of FIG. 9. Clock recovery 1001 receives self-clocking data from conductor 440, recovers clock signals and data, and transfers the data and clock signals to FIFO 1003. FIFO 1003 store the data and transmits a signal via cable 1012 to control 1005 when a complete packet is received. Control 1005 responds to the signal by transferring the contents of FIFO 1003 via driver 1006 to conductor 441 when driver 1006 is not transferring data from FIFO 1004. Control 1005 signals driver 1006 to accept data from FIFO 1003 via cable 1010. In addition, control 1005 provides clock signals to driver 1006 via cable 1010. Clock recovery 1002 and FIFO 1004 function in a similar manner.

Figure 7:
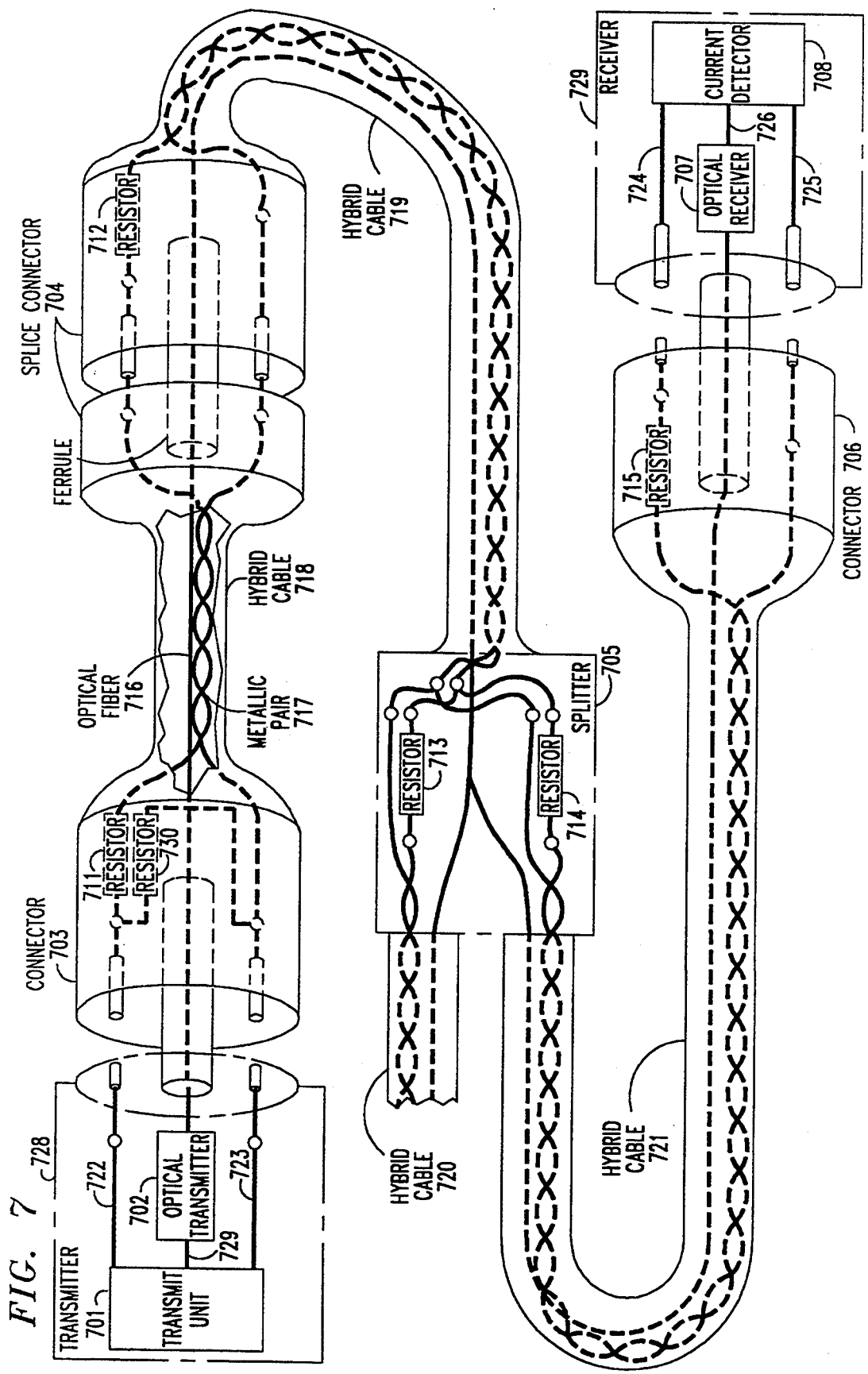
FIG. 7 illustrates an embodiment in accordance with the invention.
Figure 8:
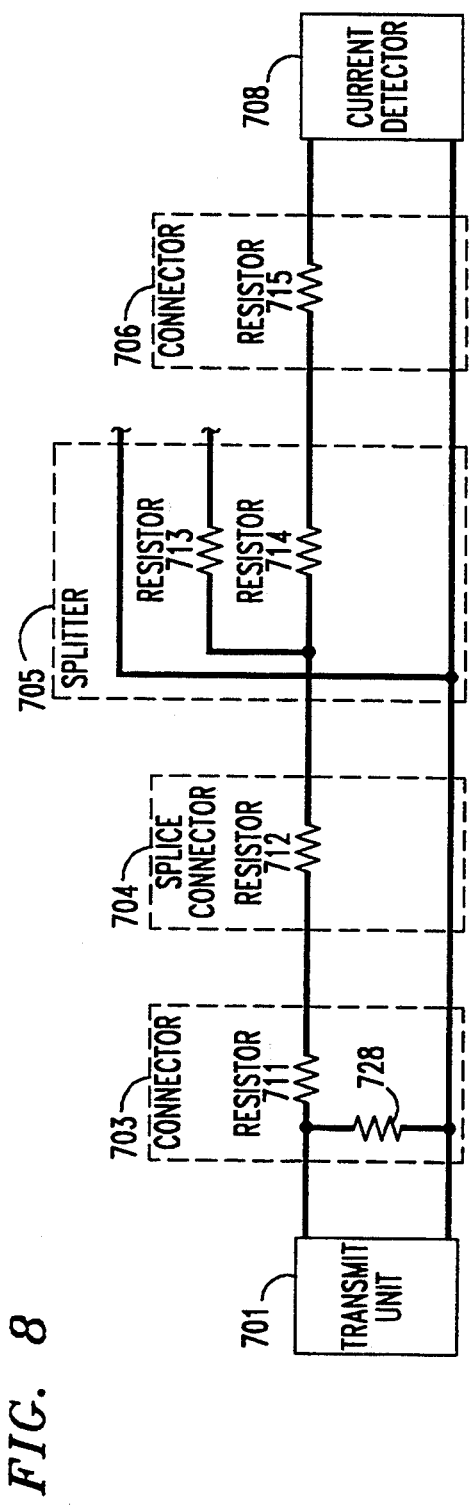
FIG. 8 illustrates the electrical schematic of the embodiment illustrated in FIG. 7.

Turning now to FIGS. 7 and 8, as was previously mentioned, light which is transmitted though a single mode optical fiber from a laser is no longer dangerous to human eyes after a short distance. In addition, it is often desirable to be able to disconnect a splice connector and measure the light output at splice connector using appropriate instruments. The embodiment illustrated in FIG. 1 does not allow the optical link to broken at splice connector 104 since transmit unit 101 detects the interruption of current and turns optical transmitter 102 off. For single mode optical fiber FIG. 7 shows a modified connector 703 which differs from connector 103; in that, resistor 730 completes the path from conductors 722 and 723 regardless whether hybrid cable 718 is terminated. FIG. 8 shows the electrical schematic for FIG. 7. A similar connector for a multimode optical fiber would not have resistor 730.

FIG. 11 illustrates an electrical schematic for an alternate embodiment of FIG. I for assuring that optical transmitter 102 is terminated on at least one optical receiver. Only conductor 123 of FIG. 1 is used, and all connectors have only electrical connections for conductors corresponding to conductor 123. Transmitter 1101 places a voltage source across the conductor corresponding to conductor 123, and receiver 1108 grounds that conductor. If transmitter 1101 detects the flow of current into the conductor in excess of a predefined amount, it enables a transmitter similar to optical transmitter 102 of FIG. 1.

FIG. 12 illustrates another electrical schematic for an alternate embodiment of FIG. 1 for assuring that optical transmitter 102 is terminated on at least one optical receiver. FIG. 12 is similar in operation to FIG. 11 except that electrical transmitters similar to transmitter 1208 are located with other optical receivers and electrical receiver 1201 is located with the optical transmitter. If electrical receiver 1201 detects the flow of electrical current above a predefined amount, it enables the optical transmitter that is equivalent to optical transmitter 102 of FIG. 1. In addition, units 1201 and 1208 could be an optical receiver and optical transmitter, respectively, with an optical link interconnecting them through the connectors. Such optical units would function in a similar manner just described for units 1201 and 1208.

Figure 13:
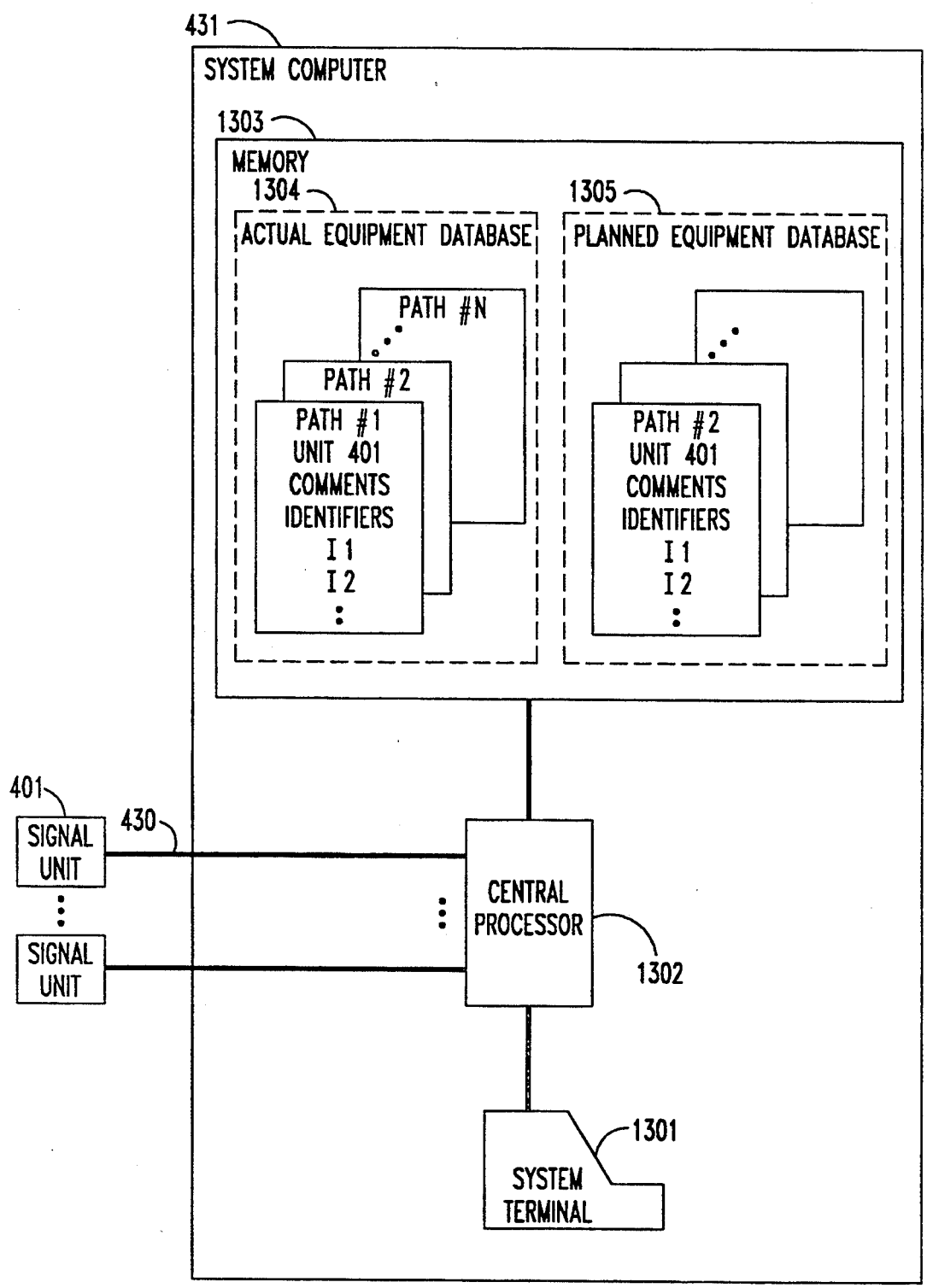
FIG. 13 illustrates, in block diagram form, a system computer.

FIG. 13 illustrates, in block diagram form, system computer 431 of FIG. 4 when using ID circuits similar to the one illustrated in FIG. 10. Each signal unit such as signal unit 401 periodically requests the identification of the optical components associated with ID circuits that are connected to the signal unit such as ID circuit 405. Each microcomputer associated with an optical receiver, such as microcomputer 408, is responsive to the resulting packet to retransmit this packet back to signal unit 401. Signal unit 401 then transmits the information concerning the identification of the optical components to central processor 1302. Memory 1303 stores various databases and the program controlling central processor 1302. However, only actual equipment database 1304 and planned equipment database 1305 are illustrated in memory 1303. These two databases only show the information stored for signal unit 401. Central processor 1302 is responsive to the path identification information received from signal unit 401 via cable 430 to store this information in actual equipment database 1304. The information is stored on the basis of each path which is ultimately terminated on optical transmitter 402. A plurality of paths result each time the optical path encounters a splitter such as splitter 405 of FIG. 4.

An important problem encountered by corporations providing telecommunications service within an office environment or the residential environment is the problem of determining the actual equipment utilized to form the different transmission paths and the planned equipment. This problem is important because the office and residential environments are constantly in a state of change and it is difficult to manually keep track of what components are installed in the various paths and indeed what paths actually exist. This problem is important during maintenance operations and in providing new service to a new offices or homes. Further, some optical components may be buried or phased-in conduits where they are difficult to inspect.

Figure 14:
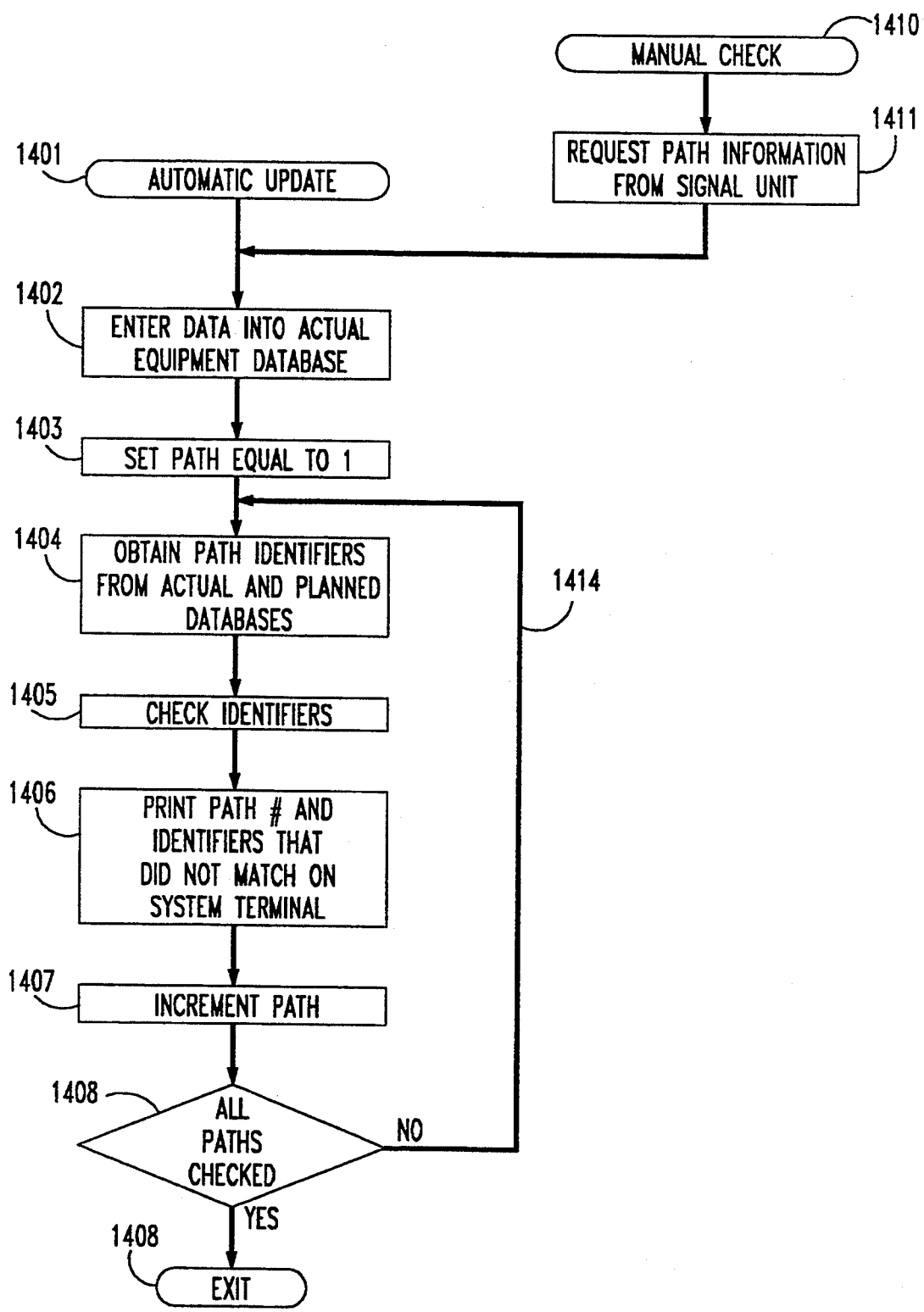
FIG. 14 illustrates a flowchart of a program for controlling the operation of a system computer.

FIG. 14 illustrates, in block diagram form, a program for automatically determining the difference between the equipment actually installed and that which is thought to be installed or planned. As previously described, the signal units periodically determine the optical components in each path connected to the signal units and transfer identifiers of those optical components to system computer 1302. FIG. 14 illustrates the start of this method of operation as entry block 1401. In response to the information received from signal unit 401, central processor 1302 stores this information into actual equipment database 1304 by execution of block 1402. Next, central processor 1302 verifies the actual optical components in the various paths interconnected to signal unit 401 with identifiers defining the number and type of optical components storm in planned equipment database 1305. To perform this operation, central processor 1302 first sets a variable called "path" equal to 1 by execution of 1403. Block 1404 then obtains the identifiers for path 1 from the actual and planned databases. Block 1405 then compares each of these identifiers to verify that the information is the same in both of the databases. Any discrepancies between the two databases is printed out on system terminal 1301 by execution of block 1406. Block 1407 increments the path variable, and decision block 1408 determines whether or not all paths have been checked. If all paths have been checked, the operation is finished, and exit block 1409 is executed. If all paths have not been checked, decision block 1408 returns control to block 1404 via path 1414.

In addition to the automatic update which periodically occurs, the user of system terminal 1301 can request that the checked be performed. When this occurs, manual check entry point 1410 is executed. Next, block 1411 is executed in which central processor 1302 transmits a request to signal unit 401 to obtain the necessary information concerning the optical components in the various paths interconnected to signal unit 401. Once signal unit 401 has collected the information, block 1402 is executed. The execution is the same as that previously described when the entry point was 1401.

In certain transmission systems, it may be desirable to have the databases maintained from information transferred from the receiving microcomputers such as microcomputer 408. In such systems, system computer 433 would perform the functions performed by system computer 431 in the previous paragraphs with respect to FIGS. 13 and 14.

It is to be understood that the above-described embodiments merely illustrative of the principals of the invention and that other arrangements may be devised by those skilled in the art without departing from the spirit and scope of the invention. In particular, one skilled in the art could readily envision that the embodiments could include attenuation and delay information for different optical wavelengths, dispersion and other physical parameters. In addition, if a microprocessor was utilized in the third embodiment in the identification circuit, the microprocessor could perform a temperature measurement and include that information in the packet transmitted to the receiver if the properties of the optical devices were sensitive to varying temperatures. In addition, one skilled in the art would readily envision how the techniques described for the first, second, and third embodiment could be used for high-speed electrical transmission systems.

I claim:

1. A transmission link having a communication path with a plurality of components each effecting performance characteristics of the communication path, comprising:
   another communication path in conjunction with the communication path and physically distinct from the communication path;
   the another communication path having another plurality of components each corresponding to one of the plurality of components of the communication path; and
   each of the another plurality of components identifying one or more characteristics of the corresponding component of the plurality of components.

2. The transmission link of claim 1 wherein the plurality of components are electrical components and the other plurality of components are also electrical components.

3. The transmission link of claim 2 wherein each of the other plurality of components is a resistor.

4. The transmission link of claim 2 wherein each of the other plurality of components is a resistor and inductor which are interconnected.

5. The transmission link of claim 2 wherein each of the other plurality of components is an active electrical circuit for inserting information into the other communication path.

6. The transmission link of claim 1 wherein the plurality of components are optical components and the another plurality of components are electrical components.

7. The transmission link of claim 6 wherein each of the another plurality of components is a resistor.

8. The transmission link of claim 6 wherein each of the another plurality of components is a resistor and inductor which are interconnected.

9. The transmission link of claim 6 wherein each of the another plurality of components is an active electrical circuit for inserting information about the corresponding optical component of each into the another communication path.

10. The transmission link of claim 6 wherein the communication path is an optical link interconnecting an optical receiver and an optical transmitter whose output may be dangerous to human eyes; and
   means connected to the other communication path for transmitting signals on the another communication path and located with the optical transmitter;
   means connected to the other communication path for receiving the transmitted signals and for retransmitting the received signals to the transmitting means via the another communication path; and
   the transmitting means responsive to receipt of the retransmitted signals for enabling the operation of the optical transmitter and responsive to the absence of the retransmitted signals for inhibiting the operation of the optical transmitter.

11. The transmission link of claim 6 wherein the communication path is an optical link interconnecting an optical receiver and an optical transmitter and
   means located with the optical transmitter and connected to the other communication path for transmitting a packet on the another communication path;
   each of the another plurality of components is an active electrical circuit for inserting information identifying the optical component type of the optical component corresponding to each of the another plurality of components into the another communication path upon receipt of the packet;
   means located with the optical receiver and connected to the another communication path for receiving the packet and for retransmitting the received packet to the transmitting means via the another communication path; and
   the transmitting means responsive to receipt of the retransmitted packet for communicating the retransmitted packet to a system computer whereby the system computer determines the optical components in the optical link.

12. An apparatus for measuring performance characteristics of a communication path in a transmission link, and the communication path having a plurality of components each effecting the performance characteristics of the communication path, comprising:
   first means connected to the communication path for transmitting signals on the communication path;
   means connected to the communication path for receiving signals from the communication path;
   another plurality of components in another communication path in conjunction with the communication path, and each of the another plurality of components corresponding to one of the plurality of components of the communication path;
   second means connected to the another communication path for transmitting signals through the another communication path;
   each of the another plurality of components responsive to the signals for identifying one or more performance characteristics of the corresponding component of the plurality of components by modifying the signals;
   means connected to the another communication path for determining the performance characteristics of the communication path in response to the signals received from the another communication path; and
   the receiving means connected to the determining means is responsive to the performance characteristics for adjusting to match the performance characteristics.

13. The apparatus of claim 12 where the receiving means is responsive to being unable to adjust for the performance characteristics for transmitting a signal to a system processor.

14. The apparatus of claim 12 where the other communication path provides a return path for the received signals from the determining means back to the second transmitting means; and
   the second transmitting means is responsive to the absence of the returned signals for inhibiting the transmission by the first transmitting means.

15. The apparatus of claim 14 wherein the second transmitting means is further responsive the absence of the returned signals for signaling another system processor.

16. The apparatus of claim 12 wherein the plurality of components are electrical components and the other plurality of components are electrical components.

17. The apparatus of claim 16 wherein each of the other plurality of components is a resistor;
   the second transmitting means transmits an electrical current; and
   the determining means measures the resistance of the resistors in the other communication path by a voltage drop to determine one performance characteristic of the communication path.

18. The apparatus of claim 17 where the other communication path provides a return path for current received from the second transmitting means by the determining means back to the second transmitting means; and the second transmitting means responsive to the absence of the returned current for inhibiting the transmission by the first transmitting means.

19. The apparatus of claim 18 where the determining means responsive to the absence of current for sending a signal to a system controller.

20. The apparatus of claim 18 where the second transmitting means further responsive to the absence of the returned current for sending a signal to another system controller.

21. The apparatus of claim 16 wherein each of the other plurality of components comprises a resistor and inductor which are interconnected;

the second transmitting means alternates between transmission of a DC electrical current and AC electrical current; and the determining means measures the resistance of the resistors in response to the DC electrical current in the other communication path to determine one performance characteristic of the communication path and measures the inductance of the inductors in response to the AC electrical current in the other communication path to determine another performance characteristic of the communication path.

22. The apparatus of claim 16 wherein each of the other plurality of components is an active electrical circuit;

the second transmitting means transmits a data packet;

each active electrical circuit is responsive to receipt of the data packet to insert data into the data packet defining performance characteristics of the corresponding one of the plurality of components; and the determining means responsive to the data packet for recovering performance information for each of the plurality of components.

23. The apparatus of claim 22 where the other communication path provides a path for returning the packet received from the second transmitting means by the determining means back to the second transmitting means; and the second transmitting means responsive to the absence of the returned packet for inhibiting the transmission by the first transmitting means.

24. The apparatus of claim 23 where the second transmitting means responsive to information in the returned packet for determining if the the first transmitting means should be inhibited.

25. The apparatus of claim 24 where the second transmitting means further responsive to information in the returned packet indicating that the first transmitting means should be inhibited for sending a message to to a system controller.

26. The apparatus of claim 24 where the second transmitting means further responsive to the returned packet to transmit the returned packet to a system controller.

27. The apparatus of claim 16 wherein each of the other plurality of components is an active electrical circuit;

the second transmitting means transmits a data packet;

each electrical circuit is responsive to receipt of the data packet to insert data into the data packet defining performance characteristics of the corresponding one of the plurality of components; and the determining means responsive to the data packet for recovering performance information for each of the plurality of components.

28. The apparatus of claim 27 wherein each of the other plurality of components is an active electrical circuit;

the second transmitting means transmits a data packet;

each active electrical circuit is responsive to receipt of the data packet to insert data into the data packet defining performance characteristics of the corresponding one of the plurality of components; and the determining means responsive to the data packet for recovering performance information for each of the plurality of components.

29. The apparatus of claim 28 where the other communication path provides a path for returning the packet received from the second transmitting means by the determining means back to the second transmitting means; and the second transmitting means responsive to the absence of the returned packet for inhibiting the transmission by the first transmitting means.

30. The apparatus of claim 29 where the second transmitting means responsive to information in the returned packet for determining if the the first transmitting means should be inhibited.

31. The apparatus of claim 30 where the second transmitting means further responsive to information in the returned packet indicating that the first transmitting means should be inhibited for sending a message to to a system controller.

32. The apparatus of claim 31 where the second transmitting means further responsive to the returned packet to transmit the returned packet to a system controller.

33. The apparatus of claim 12 wherein the plurality of components are optical components and the another plurality of components are electrical components.

34. The apparatus of claim 33 wherein each of the another plurality of components is a resistor;

the second transmitting means transmits an electrical current; and the determining means measures the resistance of the resistors in the other communication path by a voltage drop to determine one performance characteristic of the communication path.

35. The apparatus of claim 34 where the another communication path provides a return path for current received from the second transmitting means by the determining means back to the second transmitting means; and the second transmitting means responsive to the absence of the returned current for inhibiting the transmission by the first transmitting means.

36. The apparatus of claim 35 where the determining means responsible to the absence of current for sending a signal to a system controller.

37. The apparatus of claim 35 where the second transmitting means is further responsive to the absence of the returned current for sending a signal to another system controller.

38. The apparatus of claim 33 wherein each of the another plurality of components comprises a resistor and inductor which are interconnected;

the second transmitting means alternates between transmission of a DC electrical current and AC electrical current; and the determining means measures the resistance of the resistors in response to the DC electrical current in the another communication path to determine one performance characteristic of the communication path and measures the inductance of the inductors in response to the AC electrical current in the another communication path to determine another performance characteristic of the communication path.

* * * * *